Jan. 21, 1941.    L. GOLDHAMMER    2,229,289
PHOTOGRAPHIC CAMERA
Filed July 30, 1938
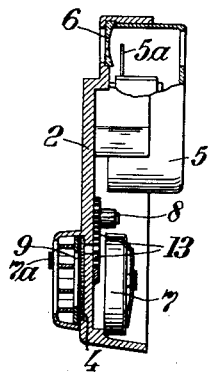
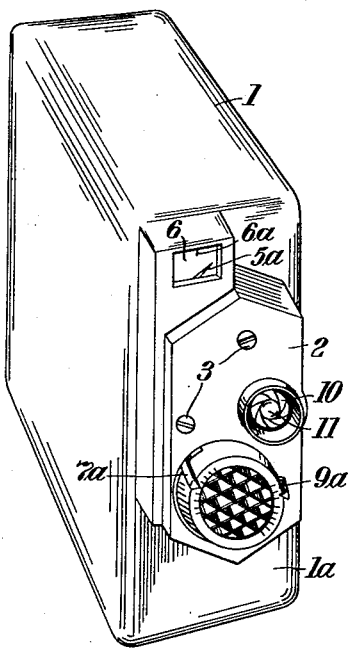
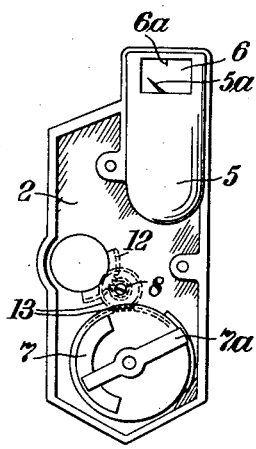
Leo Goldhammer  Inventor
By His Attorney Patented Jan. 21, 1941

2,229,289

UNITED STATES PATENT OFFICE 2,229,289

PHOTOGRAPHIC CAMERA

Leo Goldhammer, Munich, Germany, assignor, by mesne assignments, to General Aniline & Film Corporation, New York, N. Y., a corporation of Delaware Application July 30, 1938, Serial No. 222,261
In Germany August 2, 1937

2 Claims. (Cl. 95—10)

This invention relates to a photographic camera or a cinematographic camera in which a photocell and a moving coil instrument belonging thereto are comprised either within the camera or attached thereto. It is known to detachably construct the whole of the exposure meter or only the indicating instrument on a photographic camera.

This invention consists in arranging the whole exposure meter on a panel which is detachable from the camera casing. On this removable panel are also fixed a device for adjusting the light current or the cell current, for instance a resistance or a screen which, when the panel is put in place on the cinematographic camera, are automatically coupled with the screen adjustment of the exposure objective. This arrangement of the elements renders possible the connection and a testing of the photo-electric exposure meter outside the apparatus, and ensures a long life for the photo-cell and the measuring instrument owing to their protected position within the removable trough-shaped panel. A further advantage of this arrangement resides in the fact that in the event of the instrument being damaged the whole panel may be removed and another inserted in its place. Since the exposure meters are frequently arranged close to the view finder, it is of advantage to arrange that part of the finder which is in proximity to the exposure meter on the removable panel. In this manner it is possible to allow the indicator of the electrical instrument to move in the picture field of the finder in order that in viewing the object to be photographed the apparatus may simultaneously be adjusted for the correct exposure time or focal aperture corresponding with the brightness of the object to be photographed.

Reference is made to the accompanying drawing in which

Figure 1 is a perspective view of a cinematographic camera having a photo-electric exposure meter attached thereto, Figure 2 is a section through a removable panel detachable from the front wall of the camera carrying the exposure meter and the finder, Figure 3 is a rear elevation of the removable panel.

To the front wall 1a of the camera 1 is fixed a removable panel 2 by means of screws 3 or the like. On the inner side of the trough-shaped panel 2 are the photo-electric cell 4, the measuring instrument 5, the finder lens 6, the resistance 7, said measuring instrument and resistance being in circuit with said cell in known manner, and also the coupling 8 for transmitting the adjusting movement of the cell screen 9 to the iris diaphragm 10 of the exposure objective 11. The resistance and cell screen or diaphragm are adjustable by means of the pointers or levers 7a and 9a respectively. On the finder lens 6 is a mark 6a to which the pointer 5a of the moving coil instrument may be brought in adjusting the exposure meter. The iris diaphragm 10 of the objective is provided, for example, with a toothed segment 12 which, when the removable panel 2 has been put in place on the front 1a of the camera, automatically engages the toothed wheel 8. The latter is connected by gearing 13 with the iris diaphragm 9 of the cell 4 or the adjustment device of the resistance 7.

I claim:

1. A camera casing having an objective lens and an adjustable diaphragm for said lens mounted on said casing, means on the objective mount for adjusting said diaphragm, a removable panel member for said casing provided with a light sensitive cell, an adjustable diaphragm for said cell, an adjustable resistance and an indicator in circuit with said cell, means on the panel for adjusting the cell diaphragm and separate means on the panel for adjusting the resistance, means on the panel for engaging the objective diaphragm adjusting means when the panel is operatively positioned on the camera casing, means on the panel operatively connecting said engaging means with said cell diaphragm adjusting means, and said panel having an opening therein through which the objective passes for properly positioning said panel on the camera casing with the objective diaphragm adjusting means and cell diaphragm adjusting means in operative relation to each other.

2. A camera casing provided with a view finder opening therethrough and with an objective lens and an adjustable diaphragm for the objective mounted thereon, means on the objective mount for adjusting said diaphragm, a removable panel for said casing provided with a finder lens, a light sensitive cell, an adjustable diaphragm for said cell, an adjustable resistance and an indicator in circuit with said cell, the pointer of said indicator being positioned for movement in alignment with the finder lens, means on the panel for adjusting the cell diaphragm and separate means on the panel for adjusting the resistance, means on the panel for engaging the objective diaphragm adjusting means when the panel is operatively positioned on the camera casing, means on the panel operatively connecting said engaging means with said cell diaphragm adjusting means, and said panel having an opening therein through which the objective passes for properly positioning said panel on the camera casing with the finder lens in alignment with the finder opening of the camera casing and with the objective diaphragm adjusting means and cell diaphragm adjusting means in operative relation to each other.

LEO GOLDHAMMER.